US008812915B2

(12) United States Patent
Warnes et al.

(10) Patent No.: US 8,812,915 B2
(45) Date of Patent: Aug. 19, 2014

(54) DETERMINING WHETHER A RIGHT TO USE MEMORY MODULES IN A RELIABILITY MODE HAS BEEN ACQUIRED

(71) Applicant: Hewlett-Packard Development Company, L.P., Houston, TX (US)

(72) Inventors: Lidia Warnes, Roseville, CA (US); Russ W. Herrell, Fort Collins, CO (US); Blaine D. Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 13/628,659

(22) Filed: Sep. 27, 2012

(65) Prior Publication Data

US 2014/0089726 A1    Mar. 27, 2014

(51) Int. Cl.
*G06F 11/00* (2006.01)
(52) U.S. Cl.
USPC ........................................ 714/47.2; 714/6.2
(58) Field of Classification Search
CPC . G06F 11/073; G06F 11/0754; G06F 11/076; G06F 11/142; G06F 11/1428; G06F 11/3037
USPC ........................................ 714/47.2, 6.1, 6.2
See application file for complete search history.

(56) References Cited

U.S. PATENT DOCUMENTS

| 5,546,410 | A  | * | 8/1996  | Ando et al. ..................... 714/764 |
| 6,615,325 | B2 |   | 9/2003  | Mailloux et al. |
| 7,292,950 | B1 |   | 11/2007 | Resnick |
| 7,840,876 | B2 | * | 11/2010 | Sturm et al. ................... 714/766 |
| 8,230,145 | B2 |   | 7/2012  | Bresniker |
| 8,321,727 | B2 | * | 11/2012 | D'Abreu et al. ............... 714/718 |
| 8,706,950 | B2 | * | 4/2014  | Yano et al. ..................... 711/103 |
| 2006/0236161 | A1 | * | 10/2006 | Tanaka et al. ................. 714/710 |
| 2007/0079184 | A1 | * | 4/2007  | Weiss et al. ................... 714/718 |
| 2007/0168762 | A1 | * | 7/2007  | Bartley et al. .................. 714/52 |
| 2007/0180328 | A1 | * | 8/2007  | Cornwell et al. ............... 714/42 |
| 2009/0046512 | A1 | * | 2/2009  | Halloush et al. ......... 365/185.09 |
| 2009/0070651 | A1 | * | 3/2009  | Diggs et al. ................... 714/752 |
| 2010/0083036 | A1 | * | 4/2010  | Calinoiu et al. .................. 714/5 |
| 2012/0137168 | A1 | * | 5/2012  | Lu ................................. 714/6.13 |
| 2012/0151300 | A1 |   | 6/2012  | Tillema |

OTHER PUBLICATIONS

Hewlett-Packard Development Company, L.P., "Avoiding server downtime from hardware errors in system memory with HP Memory Quarantine," Technology Brief, Jan. 2012, retrieved from: <http://h20000.www2.hp.com/bc/docs/support/SupportManual/c03179047/c03179047.pdf.
Hewlett-Packard Development Company, L.P., "QuickSpecs: HP Integrity Superdome 2," Version 4, Apr. 6, 2011, retrieved from: <http://h18004.www1.hp.com/products/quickspec/archives_Division/13682_div_v4/13682_div.PDF>.

(Continued)

*Primary Examiner* — Marc Duncan
(74) *Attorney, Agent, or Firm* — Mark Kupets

(57) ABSTRACT

Examples disclosed herein relate to determining whether a right to use memory modules in a reliability mode has been acquired. Examples include determining whether the right to use a plurality of memory modules in a reliability mode has been acquired, if a performance mode is selected for operation of the plurality of memory modules.

15 Claims, 5 Drawing Sheets

(56) References Cited

OTHER PUBLICATIONS

Hewlett-Packard Development Company, L.P., "OuickSpecs: HP Integrity Superdome 2," Version 7, Mar. 26, 2012, retrieved from: <http://h18004.www1.hp.com/products/quickspecs/13682_div/13682_div.pdf>.

Hewlett-Packard Development Company, L.P., "RAS features of the Mission-Critical Converged Infrastructure," Technical White Paper, Jun. 2010, retrieved from: <http://www.intel.com/content/dam/doc/white-paper/mission-critical-computing-itanium-9300-ras-features-of-the-mission-critical-converged-infrastructure-paper.pdf>.

Hewlett-Packard Development Company L.P., "Servers and Storage Technology for the Adaptive Infrastructure," HP Technology Advisor, Nr. 2, 2006, Sep. 2006, retrieved from: <http://h40089.www4.hp.com/integrity/pdf/4AA0-7545EEE.pdf>.

* cited by examiner

DETERMINING WHETHER A RIGHT TO USE MEMORY MODULES IN A RELIABILITY MODE HAS BEEN ACQUIRED

BACKGROUND

A processor of a computing device, such as a server, desktop computer, or notebook computer, may interact with main memory of the computing device to execute an operating system, applications, and the like. In some examples, hardware implementing the main memory may include, for example, at least one memory module, each including a plurality of memory devices. Individual memory devices may periodically experience errors or fail. If the computing device is unable to compensate for these errors or failures, such errors or failures may cause an operating system, application, or the like, executed by the computing device to crash.

BRIEF DESCRIPTION OF THE DRAWINGS

The following detailed description references the drawings, wherein.

DETAILED DESCRIPTION

Figure 1:
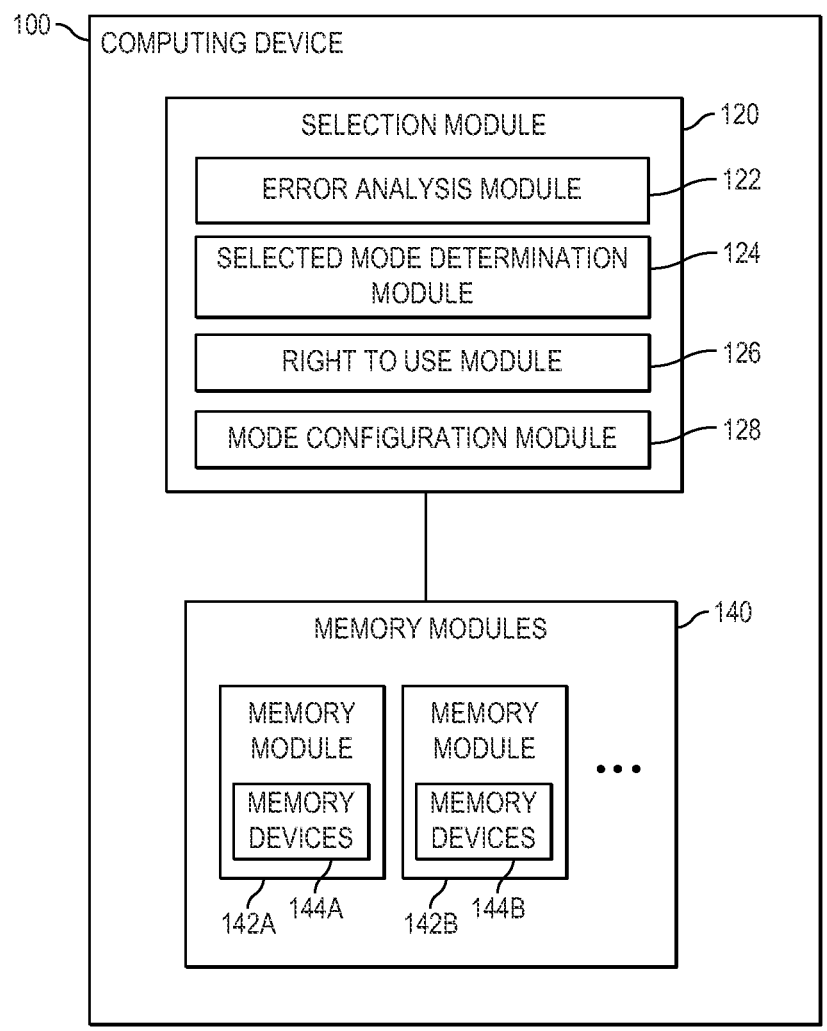
FIG. 1 is a block diagram of an example computing device to determine whether a right to use memory modules in a reliability mode has been acquired.

As noted above, if a computing device is unable to compensate for errors or failures of a memory device, such errors or failures may cause an operating system, application, or the like, executed by the computing device to crash. In some examples, such a crash may be costly to an entity reliant on the computing device, such as when a server used to perform business functions for an enterprise crashes.

Accordingly, error correction techniques may be implemented by a computing device to compensate for various memory device errors and failures. However, the availability of such techniques may lead to tradeoffs between memory performance and error correction capabilities. For example, a computing device may be capable of running in a performance mode providing relatively high memory access speed and a moderate amount of error correction capabilities. The computing device may be also be capable of running in a reliability mode providing greater error correction capabilities than the performance mode but lower memory access speeds than the performance mode. Additionally, these modes may be licensed separately, adding an additional tradeoff between the availability of these modes and cost.

In some examples, a user desiring high performance and low cost may initially obtain a license to the performance mode but not to the reliability mode. In such examples, the computing device may execute with relatively high memory bandwidth in the performance mode and even be able to correct and compensate for some errors, such as the failure of a single memory device, for example. However, over time the computing device may experience enough memory errors to reach the limits of the moderate error correction capabilities of the performance mode, putting the computing device at relatively high risk for crashing unless corrective action is taken, such as obtaining a right to use the computing device in the reliability mode, which may be able to compensate for the memory errors.

To address these issues, examples described herein may determine whether a threshold number of memory errors have been detected for any memory device of a plurality of memory modules, and determine whether the performance mode is selected for operation of the memory modules. If so, examples described herein may determine whether a right to use the memory modules in the reliability mode has been acquired. If the right to use has been acquired, examples described herein may configure the computing device to operate the memory modules in the reliability mode.

Such examples may enable a user to reduce costs and obtain high performance by obtaining a license to and utilizing the performance mode initially and subsequently obtaining license to and utilizing the reliability mode in the case of sufficient memory errors. Other corrective action that may be taken to compensate for the memory errors may include replacing at least one memory module that experienced memory errors. However, allowing a user to obtain a license to and switch to the reliability mode rather than replacing a memory module may reduce downtime of the computing device that may be associated with obtaining and installing a replacement memory module, for example, in response to memory errors.

Referring now to the drawings, FIG. 1 is a block diagram of an example computing device 100 to determine whether a right to use memory modules in a reliability mode has been acquired. As used herein, a "computing device" may be a server (e.g., a rack mount server, a stand-alone server, at least one blade server, a blade enclosure comprising at least one blade server, a partition of a blade enclosure where the partition includes at least one blade server, etc.), workstation, desktop computer, notebook computer, tablet computer, mobile phone, smart device, system on a chip (SOC), or any other processing device or equipment.

In the example of FIG. 1, computing device 100 comprises a selection module 120 and a plurality of memory modules 140. Selection module 120 may include modules 122, 124, 126, and 128. In some examples, selection module 120 may include additional modules. The functionalities of selection module 120, including the functionalities of modules 122, 124, 126, and 128, and any other modules of selection module 120, may be implemented in the form of executable instructions encoded on a machine-readable storage medium, in the form of electronic circuitry, or a combination thereof. In some examples, executable instructions implementing functionalities of selection module 120 may be stored on one machine-readable storage medium and executed by one processor of computing device 100. In other examples, various executable instructions implementing functionalities of selection module 120 may be stored on multiple different machine-readable storage media and executed by multiple different processors of computing device 100.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

In the example of FIG. 1, the plurality of memory modules 140 includes a memory module 142A including a plurality of memory devices 144A and a memory module 142B including a plurality of memory devices 144B. Although FIG. 1 illustrates two memory modules 142A, 142B, the plurality of memory modules 140 may include more than two memory modules. In some examples, each memory module of the plurality of memory modules 140 may be a dual in-line memory module (DIMM), single in-line memory module (SIMM), or any other type of memory module including a plurality of memory devices. In examples described herein, a memory device may be, for example, a dynamic random-access memory (DRAM) integrated circuit (IC).

In the example of FIG. 1, error analysis module 122 may determine whether a threshold number of memory errors have been detected for any memory device of any one of the plurality of memory modules 140. For example, module 122 may determine whether a threshold number of memory errors have been detected for any of memory devices 144A, for any of memory devices 144B, or any other memory device of memory modules 140. A memory device for which the threshold number of memory errors have been detected may be referred to herein as a "failing" memory device, and a memory module including a failing memory device may be referred to herein as a "failing" memory module. In examples described herein, the threshold number of memory errors may be an adjustable parameter of computing device 100, and may be set to any suitable number of errors. For example, the threshold number may be as few as one error or as many as one hundred or more errors.

In some examples, computing device 100 (e.g., a processor of computing device 100) may store a record of each memory error detected for any memory device of any memory module of the plurality of memory modules 140. For example, computing device 100 may store the record of each memory error in an error log stored on computing device 100. In such examples, module 122 may determine whether the threshold number of memory errors have been detected for any memory device of any one of the plurality of memory modules 140 by examining the error log of computing device 100. In such examples, module 122 may determine that the threshold number of memory errors have been detected for a given memory device of a given one of memory devices 140 if at least the threshold number of errors are indicated in the error log for the given memory device.

Selected mode determination module 124 may determine whether a performance mode is selected for operation of the plurality of memory modules 140. For example, module 124 may examine profile information stored on computing device 100 to determine whether the performance mode is selected for operation of the plurality of memory modules 140. In some examples, a configuration profile including information indicating how to configure and boot computing device 100 (or a partition thereof) may be stored on computing device 100. The configuration profile may include an indication of the mode selected for operation of the plurality of memory modules 140. In such examples, module 124 may examine the configuration profile to determine whether the performance mode is selected for operation of the plurality of memory modules 140. Module 124 may determine that the performance mode is selected if the configuration profile indicates that the performance mode is selected.

As used herein, a "performance mode" for operation of a plurality of memory modules is a mode in which, for each data word to be stored in a portion of memory implemented using the memory modules, the computing device is to store a code word representing the data word in any respective one of the memory modules. For example, main memory of a computing device may be implemented using the memory modules. In such examples, in the performance mode, for each data word to be stored in main memory, the computing device is to store a code word representing the data word within any one of the memory modules.

Also, in some examples, the computing device may include a memory controller to interface with the memory modules. In such examples, in the performance mode, for each data word to be stored in a portion of memory implemented using the memory modules, the memory controller may store the code word representing the data word in any one of the memory modules. As used herein, a "code word" may be information representing both a data word and error correction information derived from the data word. In some examples, the code word may include more bits than the data word it represents. Also, in some examples, the error correction information may include bits derived from the data word using any suitable error-correcting code (ECC).

In response to determinations that the performance mode is selected and that the threshold number of memory errors have been detected for a given memory device of a given one of memory modules 140, right to use module 126 may determine whether a right to use memory modules 140 in a reliability mode has been acquired. For example, module 126 may examine license information stored on computing device 100 to determine whether the right to use has been acquired. In some examples, an operation profile including information indicating what licenses have been obtained for computing device 100 (or a partition thereof) may be stored on computing device 100. In such examples, module 126 may examine the operation profile and determine that a right to use memory modules 140 in a reliability mode has been acquired if the operation profile indicates that the right to use has been acquired.

As used herein, a "reliability mode" for operation of a plurality of memory modules is a mode in which, for each data word to be stored in a portion of memory implemented using the memory modules, the computing device is to store a code word representing the data word across at least two memory modules such that first and second portions of the code word are stored in different memory modules of the plurality of memory modules. For example, main memory of a computing device may be implemented using the memory modules. In such examples, in the reliability mode, for each data word to be stored in main memory, the computing device is to store first and second portions of a code word representing the data word in different memory modules of the plurality. In examples in which the computing device includes a memory controller to interface with the memory modules, in the reliability mode, for each data word to be stored in a portion of memory implemented using the memory modules, the memory controller may store first and second portions of the code word representing the data word in different memory modules of the plurality.

In examples described herein, the performance mode may provide better memory performance than the reliability mode. For example, in the performance mode, each code word is stored entirely on a respective one of the memory modules, while in the reliability mode each code word is stored across multiple memory modules. Because of queuing delays associated with reading from multiple memory modules, the reliability mode may operate slower (e.g., 30% slower) than the performance mode, which reads each code word from a single memory module. However, in examples described herein, the reliability mode may provide greater error correction capabilities than the performance mode. For example, a computing device operating memory modules in the performance mode may implement single-chip sparing error correction in relation to the memory modules, while the computing device, if operating the memory modules in the reliability mode, may implement double-chip sparing error correction in relation to the memory modules.

In a performance mode implementing single-chip sparing, each code word stored on a respective memory module may contain sufficient bits of error correction information to correct for up to four correlated one-bit errors. For example, if a memory device of the memory module fails such that the portion of the code word stored on that memory device is lost, the remaining portions of the code word may be used to reconstruct the lost portion of the code word. However, once one chip fails, the computing device implementing single-chip sparing in performance mode is not able to compensate for any further memory device failure. As such, the failure of another memory device of the memory module may cause the computing device to crash.

In a reliability mode implementing double-chip sparing, each code word may be stored across two memory modules and thus may be larger than a code word stored in a single memory module. In such examples, the larger code word may enable more sophisticated error correction to be performed. Additionally, the code word, while larger in reliability mode, will not occupy all the space for a single word on each of the two memory modules. As such, much memory space is available on the memory modules for implementing double-chip sparing. In such examples implementing double-chip sparing, after the failure of a first memory device, the computing device may reconstruct the lost data from the portions of the code words stored in other memory devices and use the additional space in other memory devices as a substitute for the failed memory device, and thereafter disregard the failed memory device. Additionally, even after substituting for the failed device, the memory modules implementing double-chip sparing in reliability mode may continue to correct for errors as in single-chip sparing. As such, while in performance mode a computing device may compensate for a single memory device failure, in the reliability mode the computing device may compensate for two memory device failures.

Accordingly, in response to determinations that the performance mode is selected and that the threshold number of memory errors have been detected for a given memory device of a given one of memory modules 140, it may be beneficial to switch to the reliability mode in which, as noted above, the computing device may substitute other memory for the failing memory device and still compensate for memory errors as in single-chip sparing. As such, in some examples, in response to determinations that the performance mode is selected and that the threshold number of memory errors have been detected for a given memory device of a given one of memory modules 140, right to use module 126 may determine whether a right to use memory modules 140 in a reliability mode has been acquired.

In the example of FIG. 1, in response to a determination that the right to use the memory modules in the reliability mode has been acquired, mode configuration module 128 may configure computing device 100 to operate the plurality of memory modules 140 in the reliability mode. For example, module 128 may configure memory modules 140 to operate in the reliability mode, and configure at least a memory controller of computing device 100 to operate memory modules 140 in the reliability mode. In such examples, module 128 may configure computing device 100 to operate the given memory module including the failing memory device and the other memory modules of memory modules 140 in the reliability mode. For example, as noted above, when computing device 100 implements double-chip sparing in the reliability mode, computing device 100 may substitute other memory for the failing memory device and still provide error correction, so the given memory module may continue to be used, thereby avoiding replacement of the memory module. In some examples, functionalities described herein in relation to FIG. 1 may be provided in combination with functionalities described herein in relation to any of FIGS. 2-5.

Figure 2:
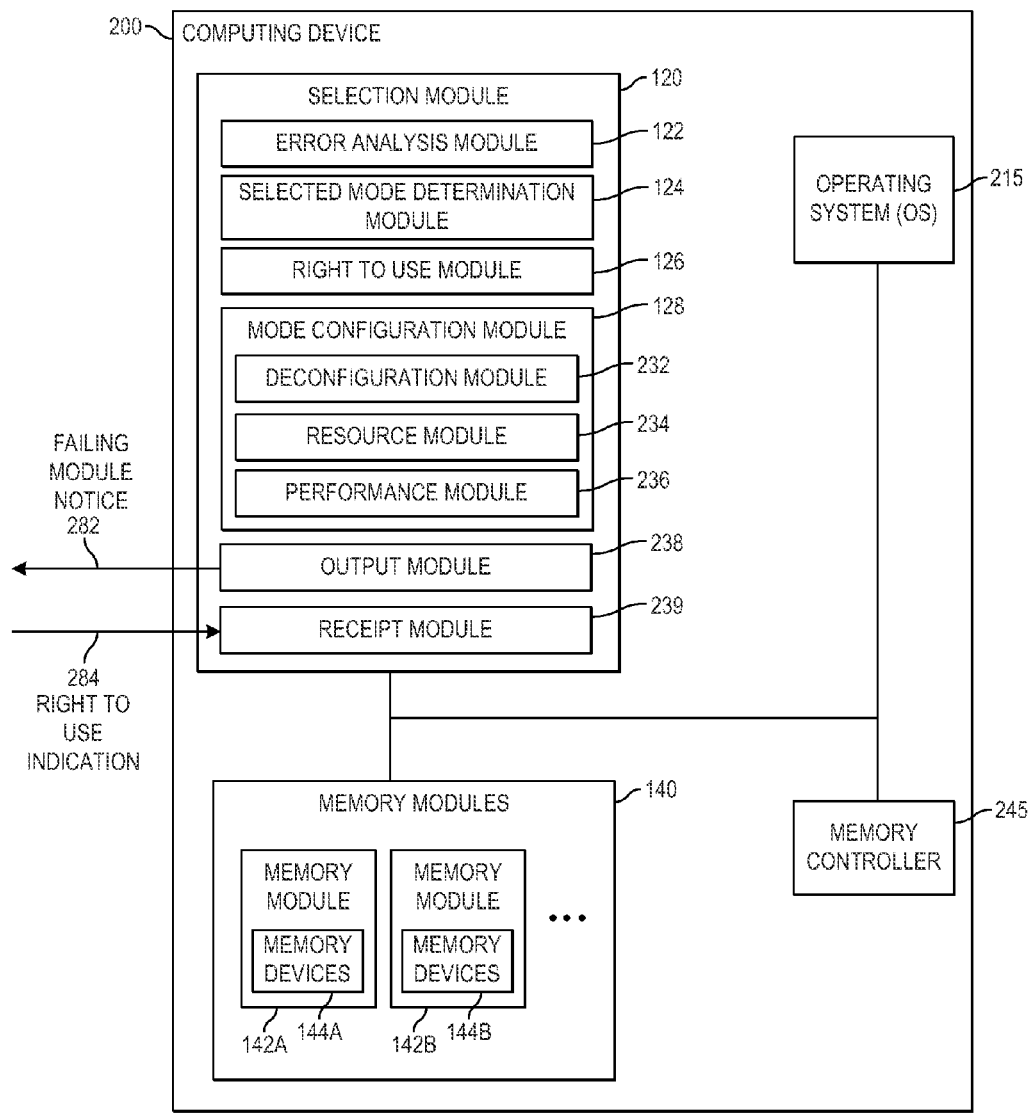
FIG. 2 is a block diagram of an example computing device to operate memory modules in a reliability mode.

FIG. 2 is a diagram of an example computing device 200 to operate memory modules 140 in a reliability mode. In the example of FIG. 2, computing device 200 comprises a selection module 120 including modules 122, 124, 126, and 128, as described above in relation to FIG. 1, and additionally including modules 232, 234, 236, 238, and 239. In some examples, selection module 120 may include additional modules. The functionalities of selection module 120, including the functionalities of modules 122, 124, 126, 128, 232, 234, 236, 238, 239, and any other modules of selection module 120, may be implemented in the form of executable instructions encoded on a machine-readable storage medium, in the form of electronic circuitry, or a combination thereof. In some examples, executable instructions implementing functionalities of selection module 120 may be stored on one machine-readable storage medium and executed by one processor of computing device 200. In other examples, various executable instructions implementing functionalities of selection module 120 may be stored on multiple different machine-readable storage media and executed by multiple different processors of computing device 200.

In the example of FIG. 2, computing device 200 may include a plurality of memory modules 140, as described above in relation to FIG. 1. As noted above in relation to FIG. 1, each of memory modules 140 may be a DIMM, and each memory device of each of the memory modules 140 may be an IC, such as a DRAM IC. Computing device 200 may also include a memory controller 245 to interface with memory modules 140, and an operating system (OS) 215 for computing device 200 that may be implemented by a processor of computing device 200.

In some examples, during run time, a processor executing OS 215 may detect memory errors in memory modules 140 and log the errors in an error log of computing device 200. In examples described herein, run time may be, for example, a period during which OS 215 is being executed by computing device 200 (or a partition thereof) and has control of computing device 200 (or a partition thereof). Error analysis module 122 may determine during run time whether a threshold number of memory errors have been detected for any memory device of any one of the plurality of memory modules 140, as described above in relation to FIG. 1. If the threshold number of errors have been detected for any given memory device of any given memory module 140, selected mode determination module 124 may determine during run time whether a performance mode is selected for operation of the plurality of memory modules 140, as described above in relation to FIG. 1.

In the example of FIG. 2, if during run time it is determined that the threshold number of errors have been detected for a given memory device of a given memory module 140 and that the performance mode is selected, then output module 238 may output a notice 282 during run time indicating that the given memory module 140 has been determined to be failing. Notice 282 (e.g., a failing module notice 282) may identify the given memory module, of memory modules 140, that was determined to be failing. In some examples, notice 282 may additionally indicate corrective actions that may be taken to address the failing memory module, such as obtaining the right to use memory modules 140 in the reliability mode, replacing the failing memory module, deconfiguring the failing memory module, and the like. In some examples, notice 282 may be output via a user interface of computing device 200, or another computing device with which computing device 200 is in communication.

In the example of FIG. 2, receipt module 239 may receive an indication 284 that the right to use the memory modules in a reliability mode has been acquired. For example, the indication 284 may be a license key (e.g., a code or the like) input to computing device 200 by a user after purchasing the right to use the reliability mode, and may be received during run time. In some examples, after receiving notice 282, a user may use an out-of-band method (e.g., telephone a licensing authority, or any other suitable method) to purchase the right to use the reliability mode and receive the license key after the purchase. In other examples, notice 282 may provide an option to trigger an automated process to purchase the right to use the reliability mode. In such examples, in response to selection of that option, selection module 120 may contact a licensing authority to purchase the right to use on behalf of the user, and after the right to use has been purchased, receipt module 239 may receive the right to use indication 284, such as a license key, from the licensing authority. In some examples, after receiving indication 284, receipt module 239 may indicate in an operation profile that the right to use has been acquired. In other examples, a user may take other corrective action in response to notice 282.

In some examples, selection module 120 may perform a mode selection process after outputting notice 282. In some examples, in response to notice 282, a user may reboot computing device 200 (or a partition thereof) after taking corrective action (or not), and the mode selection process may be performed by selection module 120 during boot time. For example, after obtaining a right to use the reliability mode or replacing the failing memory module, a user may reboot computing device 200 (or a partition thereof) and the mode selection process may be performed during a boot process. In examples described herein, a boot time may be a period during which a computing device (or a partition thereof) is being booted and prior to an operating system taking control of the computing device (or partition). In other examples, selection module 120 may perform the mode selection process after the corrective action is taken during run time and without rebooting computing device 200 (or a partition thereof). In such examples, the mode selection process may determine to switch operation of the memory modules from the performance mode to the reliability mode, and then switching to the reliability mode without rebooting. In such examples, if computing device 200 switches from the performance mode to the reliability mode without rebooting, computing device 200 may re-interleave the memory implemented by memory modules 140.

In some examples, in the mode selection process of module 120, error analysis module 122 may determine whether a threshold number of memory errors have been detected for any memory device of any given one of the plurality of memory modules 140, as described above in relation to FIG. 1. Additionally, selected mode determination module 124 may determine whether a performance mode is selected for operation of the plurality of memory modules 140, as described above in relation to FIG. 1. In response to determinations that the performance mode is selected and that the threshold number of memory errors have been detected for a given memory device of a given one of memory modules 140, right to use module 126 may determine whether a right to use memory modules 140 in a reliability mode has been acquired, as described above in relation to FIG. 1.

In response to a determination that the right to use the memory modules in the reliability mode has been acquired, mode configuration module 128 may configure computing device 100 to operate the plurality of memory modules 140 in the reliability mode, as described above in relation to FIG. 1. For example, module 128 may configure memory modules 140 to operate in the reliability mode, and configure at least memory controller 245 to operate memory modules 140 in the reliability mode. In such examples, if module 128 has configured computing device 200 to operate memory modules 140 in the reliability mode, memory controller 245 is to, for each data word to be stored in memory modules 140, store first and second portions of a code word representing the data word in separate memory modules of the plurality of memory modules 140. As described above in relation to FIG. 1, computing device 200 is capable of performing double-chip sparing error correction in relation to memory modules 140, if configuration module 128 has configured computing device 200 to operate memory modules 140 in the reliability mode.

In other examples, during the mode selection process, in response to a determination that the right to use memory modules 140 in the reliability mode has not been acquired, a deconfiguration module 232 may deconfigure the given memory module. In such examples, module 232 may indicate in a configuration profile that the given one of memory modules 140 (including the memory module for which the threshold number of errors was detected) is not to be utilized by computing device 200 during run time. In such examples, resource module 234 may determine whether the collective memory capacity of the other memory modules 140, excluding the failing and deconfigured memory module, is sufficient to run OS 215.

In response to a determination that the collective memory capacity of the other memory modules 140 is sufficient to run OS 215, performance module 236 may configure computing device 200 to operate the other memory modules 140 in the performance mode. For example, based on configuration information in the configuration profile, including an indication that the performance mode is selected for operation of the memory modules, module 236 may configure the other memory modules 140 to operate in the performance mode, and configure at least memory controller 245 to operate the other memory modules 140 in the performance mode.

In such examples, if module 236 has configured computing device 200 to operate the other memory modules 140 in the performance mode, memory controller 245 is to, for each data word to be stored in the other memory modules 140, store a code word representing the data word any respective one of the other memory modules 140. In some examples, computing device 200 is capable of performing single-chip sparing error correction in relation to the other memory modules 140, as described above in relation to FIG. 1, if module 236 has configured the computing device to operate the other memory modules 140 in the performance mode. In some examples, functionalities described herein in relation to FIG. 2 may be provided in combination with functionalities described herein in relation to any of FIGS. 1 and 3-5.

Figure 3:
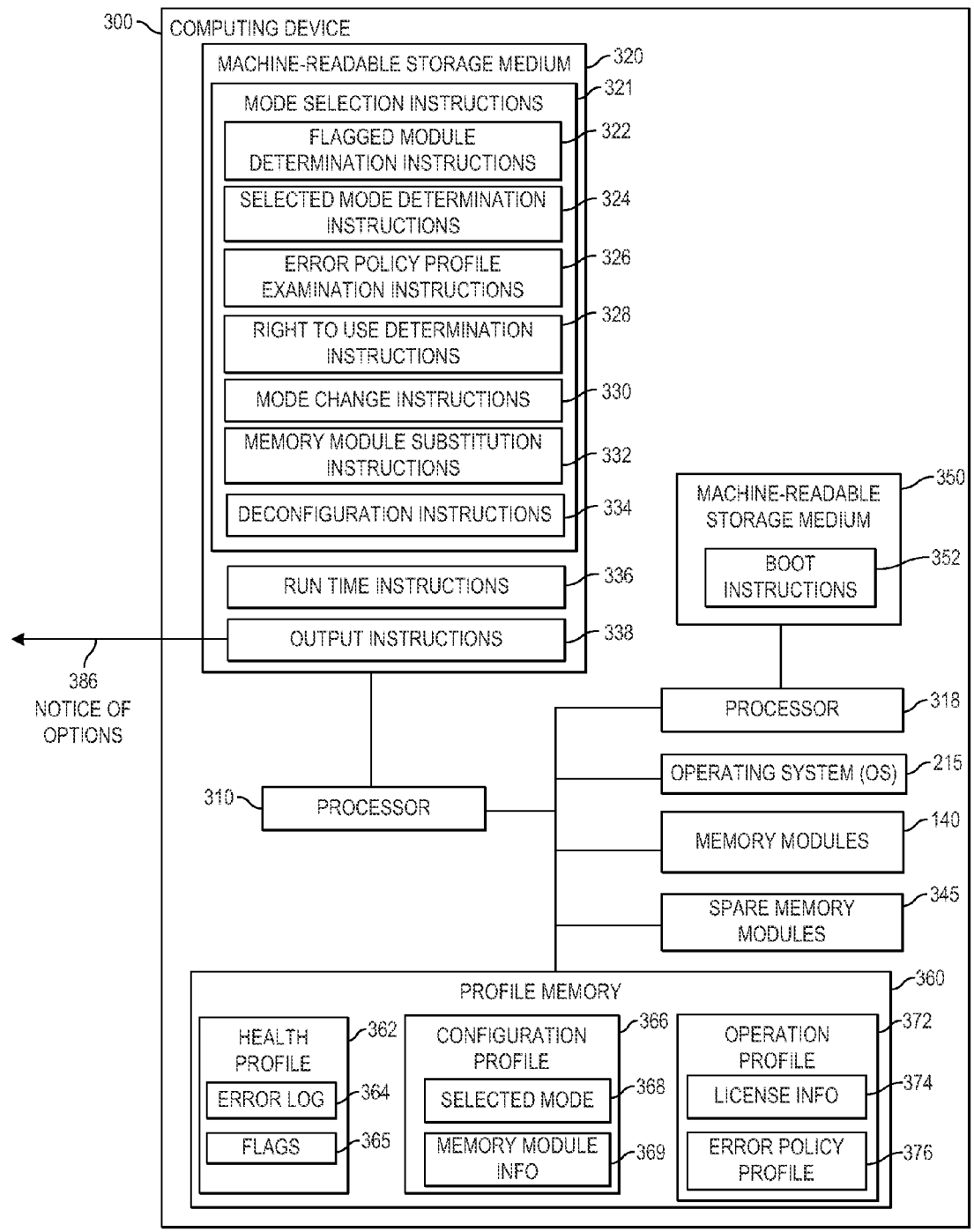
FIG. 3 is a block diagram of an example computing device to examine an error policy profile in response to a determination that a memory module has been flagged as failing.

FIG. 3 is a block diagram of an example computing device 300 to examine an error policy profile in response to a determination that a memory module has been flagged as failing. In the example of FIG. 3, computing device 300 includes a processor 310 and a machine-readable storage medium 320 encoded with instructions 321, 322, 324, 326, 328, 330, 332, 334, 336, and 338. In some examples, storage medium 320 may include additional instructions. Processor 310 may fetch, decode, and execute instructions stored on storage medium 320 to implement the functionalities described below. In other examples, the functionalities of any of the instructions of storage medium 320 may be implemented in the form of electronic circuitry, in the form of executable instructions encoded on a machine-readable storage medium, or a combination thereof.

In the example of FIG. 3, computing device 300 also includes a processor 318 and a machine-readable storage medium 350 encoded with at least boot instructions 352. Processor 318 may fetch, decode, and execute instructions stored on storage medium 350 to implement the functionalities described below. In other examples, the functionalities of any of the instructions of storage medium 350 may be implemented in the form of electronic circuitry, in the form of executable instructions encoded on a machine-readable storage medium, or a combination thereof. In the example of FIG. 3, computing device 300 also includes an OS 215 and memory modules 140, as described above in relation to FIG. 1. In the example of FIG. 3, processor 318 may boot computing device 300 (or a partition thereof) during boot time and execute OS 215 during run time. Computing device 300 also includes at least one spare memory module 345. In some examples, each of spare memory modules 345 may be a DIMM including a plurality of memory devices (e.g., DRAM IC's), or any other suitable type of memory module. Also, in some examples, each of spare memory modules 345 may be the same size (e.g., have the same memory capacity) as each of memory modules 140.

Computing device 300 also includes profile memory 360 storing a health profile 362, a configuration profile 366, and an operation profile 372. In some examples, health profile 362 may include an error log 364 where OS 215 may log errors detected in relation to memory modules 140 and 345, and flags 365 indicating memory modules of computing device 300 determined to be failing. In some examples, configuration profile 366 may include information indicating how to configure and boot computing device 300 (or a partition thereof). For example, configuration profile 366 may include memory module information 369 indicating which of memory modules 140 and 345 are to be used by OS 215, and a selected mode indication 368 indicating a mode selected for the operation of the memory modules indicated in memory module information 369. In such examples, boot instructions 352 may utilize information stored in configuration profile 366 to determine how to boot computing device 300 (or a partition thereof).

In the example of FIG. 3, operation profile 372 may include license information 374, which may indicate each license, right to use, preauthorization, and any other type of authorization that has been obtained for computing device 300 or a partition thereof. Operation profile 372 may also include an error policy profile 376. As used herein, an "error policy profile" is a collection of information including policy choices specifying how to handle memory module error conditions, such as a failing memory module. In some examples, profile memory 360 may be one machine-readable storage medium. In other examples, profile memory 360 may be implemented by a plurality of different machine-readable storage media. In such examples, profiles 362, 366, and 372 may each be stored on different storage media, or any one of profiles 362, 366, and 372 may be stored on a different storage medium than the other profiles.

In some examples, during run time, processor 318 executing OS 215 may detect memory errors in memory modules 140 and log the errors in error log 364 of health profile 362. In such examples, run time instructions 336 may determine during run time whether a threshold number of memory errors have been detected for a memory device of any one of the plurality of memory modules 140. For example, instructions 336 may examine error log 364 to determine whether the threshold number of memory errors have been detected for a memory device of any of memory modules 140.

In response to a determination during run time that the threshold number of memory errors have been detected for a memory device of a particular one of memory modules 140, instructions 336 may examine an error policy profile 376 associated with the memory modules during run time to determine how to handle the failing memory module. For example, in response to a determination that error policy profile 376 specifies that computing device 300 replace a failing one of memory modules 140 with a spare memory module 345 preauthorized for use in connection with memory modules 140, instructions 336 may specify, in configuration profile 366, that the spare memory module be logically substituted for the particular failing memory module 140, if the spare memory module 345 is preauthorized for use in connection with memory modules 140. In such examples, instructions 336 may determine from license information 374 whether any spare memory module 345 is preauthorized for use in connection with memory modules 140.

As used herein, a "preauthorization" for the use of a component, mode, or other feature of a computing device is a permission to begin use of the feature prior to obtaining a right to use the feature. As used herein, a feature for which a preauthorization to use has been obtained may be referred to herein as a "preauthorized" feature or a feature "preauthorized for use". In some examples, use of a preauthorized feature of a computing device may trigger a process by which an entity associated with the computing device is billed for the right to use the feature. An example of a preauthorized feature of a computing device is an "instant capacity" (iCAP) feature, such as an iCAP memory module (e.g., an iCAP DIMM).

In some examples, if error policy profile 376 does not specify to replace a failing one of memory modules 140 with a preauthorized spare memory module 345, or no spare memory module 345 is preauthorized for use, instructions 336 may flag the particular failing memory module 140 among flags 365 of health profile 362, if the performance mode is selected for the operation of memory modules 140. Instructions 336 may determine the selected mode by examining the selected mode indication 368 of configuration profile 366. After flagging the failing memory module, output instructions 338 may output a notice 386 of options of corrective actions that may be taken to handle the failing memory module. In such examples, the notice 386 may indicate a first option to replace the failing memory module and a second option to acquire a right to use memory modules 140 in a reliability mode. The notice may be output via a user interface of computing device 300, or another computing device with which computing device 300 is in communication. In some examples, instructions 336 may receive an indication that the right to use memory modules 140 in the reliability mode has been acquired, as described above in relation to FIG. 2, and store an indication that the right to use has been acquired in license information 374.

In some examples, after outputting notice 386, mode selection instructions 321 may perform a mode selection process. In some examples, in response to notice 386, a user may reboot computing device 300 (or a partition thereof) after taking corrective action (or not), and the mode selection process may be performed by mode selection instructions 321 during boot time. In other examples, mode selection instructions 321 may perform the mode selection process after the corrective action is taken during run time and without rebooting computing device 300 (or a partition thereof).

In the example of FIG. 3, instructions 322 may determine whether any of the plurality of memory modules 140 has been flagged as failing. In such examples, instructions 322 may examine flags 365 of health profile 362 to determine whether any of memory module 140 has been flagged as failing. In addition, instructions 324 may determine a mode selected for operation of memory modules 140. In such examples, instructions 324 may examine the selected mode indication 368 of configuration profile 366 to determine the mode selected for operation of memory modules 140. For example, by examining configuration profile 366, instructions 324 may determine whether the selected mode is the performance mode or the reliability mode.

In response to determinations that a given one of memory modules 140 has been flagged as failing and the selected mode is the performance mode, instructions 326 may examine error policy profile 376 to determine a manner specified by profile 376 for handling a failing memory module 140. In such examples, in response to a determination that error policy profile 376 specifies operating the memory modules in the reliability mode if licensed, instructions 328 may determine whether a right to use memory modules 140 in the reliability mode has been acquired. In such examples, instructions 328 may examine license information 374 to determine whether it includes an indication that the right to use memory modules 140 in the reliability mode has been acquired.

In response to a determination that the right to use has been acquired, instructions 330 may change the selected mode for operation of memory modules 140, including the failing memory module, from the performance mode to the reliability mode. In such examples, instructions 330 may change the selected mode indication 368 in configuration profile 366 from indicating the performance mode to indicating the reliability mode. In the example of FIG. 3, boot instructions 352 determine from configuration profile 366 how to boot computing device 300 (or a partition thereof) after the mode selection process. In such examples, after instructions 330 change the selected mode indication 368 to indicate the reliability mode, boot instruction 352 may examine configuration profile 366 and configure computing device 300 to operate memory modules 140 in the reliability mode in response to determining that the selected mode indication 368 indicates the reliability mode, and memory module information 369 indicates that all memory module 140 are to be configured for use by OS 215.

In other examples, in response to a determination by instructions 326 that error policy profile 376 specifies that the reliability mode is preauthorized for use in association with the memory modules, instructions 330 may change the selected mode for operation of memory modules 140, including the failing memory module, from the performance mode to the reliability mode, even though the right to use the reliability mode has not been acquired previously. In such examples, instructions 330 may change the selected mode indication 368 in configuration profile 366 from indicating the performance mode to indicating the reliability mode. In some examples, use of the preauthorized reliability mode may trigger a process by which an entity associated with computing device 300 is billed for the right to use the reliability mode.

In other examples, error policy profile 376 may specify that at least one of spare memory modules 345 of the computing device is preauthorized for use in connection with the plurality of memory modules 140. In such examples, in response to a determination by instructions 326 that error policy profile 376 specifies that a spare memory module 345 is preauthorized for use in connection with memory modules 140, instructions 332 may specify, in configuration profile 366 associated with memory modules 140, that the spare memory module 345 be logically substituted for the failing memory module. In such examples, instructions 332 may indicate in memory module information 369 that the failing memory module is not to be configured for operation, and that the preauthorized spare memory module 345 is to be configured and used in place of the failing memory module. In such examples, based on configuration profile 366, boot instructions 352 may configure the memory modules 140 other than the failing memory module to operate, and may configure the spare memory module 345 to operate in place of the failing memory module.

In other examples, error policy profile 376 may specify that the failing memory module be deconfigured. In such examples, in response to a determination by instructions 326 that error policy profile 376 specifies deconfiguring the failing memory module, instructions 334 may specify in memory module information 369 of configuration profile 366 that the failing memory module not be utilized by computing device 300. In such examples, instructions 334 may indicate in memory module information 369 that the failing memory module is not to be configured for operation. In such examples, based on configuration profile 366, boot instructions 352 may configure the memory modules 140 other than the failing memory module to operate, and not configure the failing memory module to operate. In some examples, functionalities described herein in relation to FIG. 3 may be provided in combination with functionalities described herein in relation to any of FIGS. 1-2 and 4-5.

Figure 4:
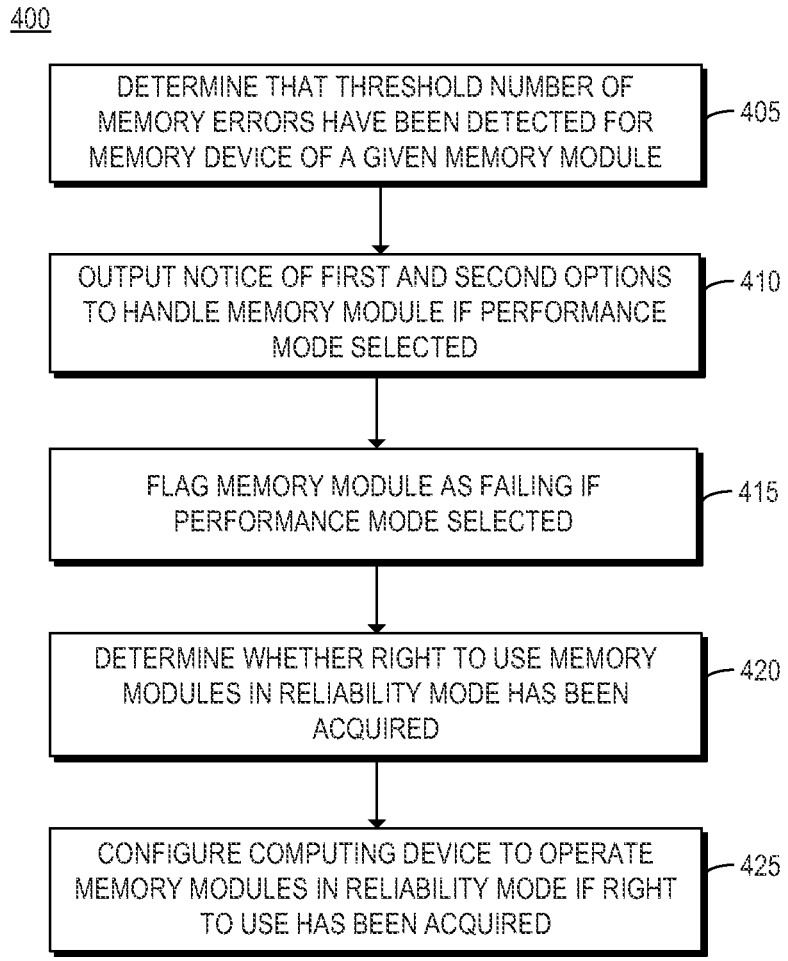
FIG. 4 is a flowchart of an example method for determining whether a right to use memory modules in a reliability mode has been acquired.

FIG. 4 is a flowchart of an example method 400 for determining whether a right to use memory modules in a reliability mode has been acquired. Although execution of method 400 is described below with reference to computing device 300 of FIG. 3, other suitable components for execution of method 400 can be utilized (e.g., computing device 100 or 200). Additionally, method 400 may be implemented in the form of executable instructions encoded on a machine-readable storage medium, in the form of electronic circuitry, or a combination thereof.

At 405 of method 400, computing device 300 may determine that a threshold number of memory errors have been detected for one of a plurality of memory devices of a given memory module of a plurality of memory modules 140 of computing device 300. In some examples, instructions 336 may examine error log 364 to determine whether the threshold number of memory errors have been detected for a memory device of any of memory modules 140. At 410, if a performance mode is selected for operation of memory modules 140, computing device 300 may output a notice 386 of a first option to replace the given memory module and a second option to acquire a right to use memory modules 140 in a reliability mode, as described above in relation to FIG. 2. In such examples, instructions 336 may determine whether the performance mode is the selected mode by examining the selected mode indication 368 of configuration profile 366. In some examples, the notice 386 may be output by output instructions 338 during run time.

At 415, computing device 300 may flag the given memory module as failing in health profile 362 if the performance mode is selected. For example, instructions 336 may flag the particular failing memory module 140 among flags 365 of health profile 362. At 420, after outputting the notice 386, computing device 300 may determine whether the right to use memory modules 140 in the reliability mode has been acquired. In some examples, a user may reboot computing device 300 after taking corrective action in response to the notice 386. In such examples, during boot time, instructions 328 may determine whether the right to use has been acquired, as described above in relation to FIG. 2.

At 425, in response to a determination that the right to use has been acquired, computing device 300 may be configured to operate the plurality of memory modules 140, including the memory module flagged as failing, in the reliability mode. For example, in response to a determination by instructions 328 that the right to use has been acquired, instructions 330 may change the selected mode indication 368 in configuration profile 366 from indicating the performance mode to indicating the reliability mode. In such examples, after the selected mode indication 368 is changed, boot instruction 352 may examine configuration profile 366 and configure computing device 300 to operate memory modules 140 in the reliability mode in response to determining that the selected mode indication 368 indicates the reliability mode. In some examples, functionalities described herein in relation to FIG. 4 may be provided in combination with functionalities described herein in relation to any of FIGS. 1-3 and 5.

Figure 5:
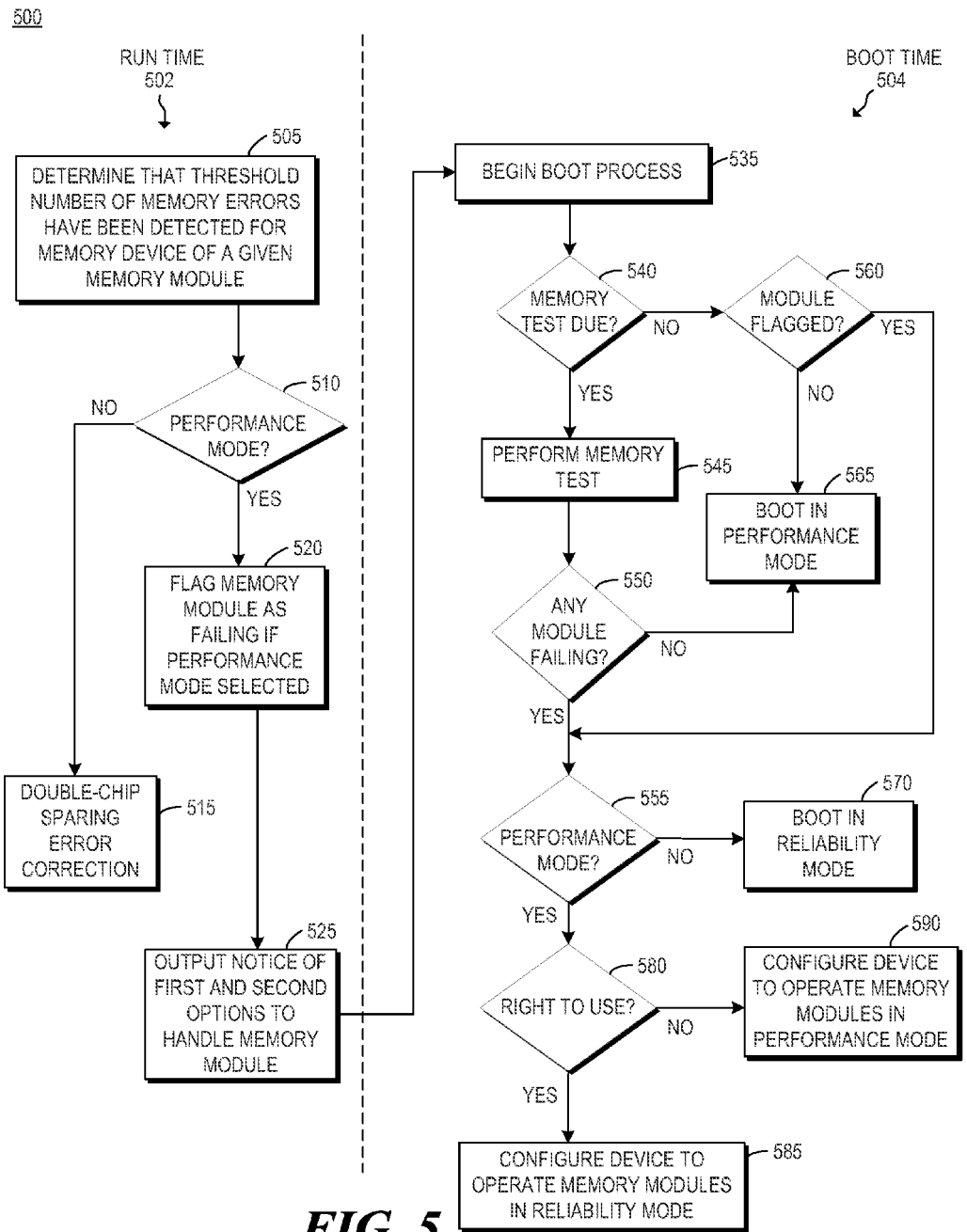
FIG. 5 is a flowchart of an example method for configuring a computing device to operate memory modules in a reliability mode.

FIG. 5 is a flowchart of an example method 500 for configuring a computing device to operate memory modules in a reliability mode. Although execution of method 500 is described below with reference to computing device 300 of FIG. 3, other suitable components for execution of method 500 can be utilized (e.g., computing device 100 or 200). Additionally, method 500 may be implemented in the form of executable instructions encoded on a machine-readable storage medium, in the form of electronic circuitry, or a combination thereof. In the example of FIG. 5, the functionalities performed at 505-525 of method 500 may be performed during run time 502 of computing device 300, and the functionalities performed at 535-585 of method 500 may be performed during boot time 504 of computing device 300 in which computing device 300 performs a boot process.

At 505 of method 500, computing device 300 may determine that a threshold number of memory errors have been detected for one of a plurality of memory devices of a given memory module of a plurality of memory modules 140 of computing device 300. For example, instructions 336 may determine that the threshold number of errors have been detected by examining error log 364, as described above in relation to FIG. 3. At 510, computing device 300 may determine whether a performance mode is selected for operation of memory modules 140. In some examples, instructions 324 may determine the selected mode by examining configuration profile 366, as described above in relation to FIG. 3. If the reliability mode is selected rather than the performance mode, then at 515, computing device 300 may perform double-chip sparing error correction in response to determining that the threshold number of memory errors have been detected. In such examples, computing device 300 may compensate for the failing memory module using double-chip sparing error correction, as described above in relation to FIG. 1.

Alternatively, if computing device 300 determines at 510 that the performance mode is selected, then at 520 computing device 300 may flag the given memory module as failing in health profile 362. Also if the performance mode is selected, at 525, computing device 300 may output a notice 386 of a first option to replace the given memory module and a second option to acquire a right to use the memory modules in the reliability mode. In response, a user of computing device 300 may take corrective action to handle the failing memory module and subsequently reboot computing device 300. After outputting notice 386 at 525 and rebooting, computing device 300 may determine during boot time 504 whether the right to use has been acquired.

At 535, computing device 300 may begin a boot process for computing device 300 or a partition thereof. At 540, computing device 300 may determine whether a memory test of the memory modules is due during the boot process. In some examples, computing device 300 may determine that the memory test is due if the boot process is being performed for the first time, or for the first time after a repair has taken place. If the memory test is not due, then, during the boot process, computing device 300 may determine at 560 whether any of the memory modules 140 has been flagged as failing. If not, then at 565 computing device 300 may boot in the performance mode. If one of memory modules 140 is flagged as failing, then at 555, computing device 300 may determine whether the performance mode is selected. If not, (i.e., if the reliability mode is selected) then at 570, computing device 300 may boot in the reliability mode.

Alternatively, in response to determining at 560 that one of the memory modules has been flagged as failing, and determining at 555 that the performance mode is selected, computing device 300 may determine at 580 whether an operation profile associated with the memory modules indicates that the right to use has been acquired. If so, then at 585, computing device 300 may be configured to operate memory modules 140, including the flagged memory module, in the reliability mode. If not, then at 590, computing device 300 may be configured to operate remaining memory modules 140, excluding the flagged memory module in the performance mode.

If it is determined at 540 that the memory test is due, then at 545, computing device 300 may perform the memory test on memory modules 140 during the boot process. At 550, computing device 300 may determine whether any of memory modules 140 was determined to be failing by the memory test. If not, then computing device 300 may boot in performance mode at 565.

If computing device 300 determines at 550 that one of the memory modules is failing based on the memory test, computing device 300 may determine at 555 whether the performance mode is selected, as described above in relation to FIG. 3. If computing device 300 determines at 550 that one of the memory modules is failing based on the memory test, and determines at 555 that the performance mode is selected, then at 580 computing device 300 may determine whether operation profile 372 indicates that the right to use memory modules 140 in the reliability mode has been acquired. If so, then at 585, computing device 300 may be configured to operate memory modules 140, including the failing memory module, in the reliability mode. If not, then at 590, computing device 300 may be configured to operate remaining memory modules 140, excluding the failing memory module in the performance mode. In some examples, functionalities described herein in relation to FIG. 5 may be provided in combination with functionalities described herein in relation to any of FIGS. 1-4.

What is claimed is:

1. A computing device comprising:
a plurality of memory modules, each including a plurality of memory devices;
an error analysis module to determine whether a threshold number of memory errors have been detected for any memory device of any one of the memory modules;
a selected mode determination module to determine whether a performance mode is selected for operation of the memory modules;
a right to use module to determine whether a right to use the memory modules in a reliability mode has been acquired, in response to determinations that the performance mode is selected and the threshold number of memory errors have been detected for a memory device of a given one of the memory modules; and
a mode configuration module to configure the computing device to operate the given memory module and the other memory modules in the reliability mode, in response to a determination that the right to use has been acquired.

2. The computing device of claim 1, further comprising:
an output module to output a notice indicating that one of the memory modules has been determined to be failing, if the performance mode is selected; and
a receipt module to receive an indication that the right to use the memory modules in a reliability mode has been acquired.

3. The computing device of claim 1, wherein the mode configuration module further comprises:
a deconfiguration module to deconfigure the given memory module in response to a determination that the right to use has not been acquired.

4. The computing device of claim 3, wherein the mode configuration module further comprises:
a resource module to determine whether the collective memory capacity of the other memory modules is sufficient to run an operating system (OS) of the computing device, wherein the other memory modules comprise the plurality of memory modules excluding the given memory module; and
a performance module to configure the computing device to operate the other memory modules in the performance mode, in response to a determination that the collective memory capacity of the other memory modules is sufficient to run the OS.

5. The computing device of claim 4, further comprising:
a memory controller to interface with the memory modules, wherein, if the mode configuration module has configured the computing device to operate the memory modules in the reliability mode, the memory controller is to, for each data word to be stored in the memory modules, store first and second portions of a code word representing the data word in different memory modules of the plurality of memory modules;
wherein each of the memory modules is a dual in-line memory module (DIMM), and each of the memory devices is an integrated circuit (IC).

6. The computing device of claim 5, wherein:
the computing device is capable of performing double-chip sparing error correction in relation to the memory modules if the configuration module has configured the computing device to operate the memory modules in the reliability mode; and
the computing device is capable of performing single-chip sparing error correction in relation to the other memory modules if the configuration module has configured the computing device to operate the other memory modules in the performance mode.

7. A non-transitory machine-readable storage medium encoded with instructions executable by a processor of a computing device, the storage medium comprising instructions to:
determine whether any of a plurality of memory modules of the computing device has been flagged as failing;
determine a mode selected for operation of the memory modules;
in response to determinations that a given one of the memory modules has been flagged as failing and the selected mode is the performance mode, examine an error policy profile specifying how to handle a failing memory module of the plurality of memory modules;
in response to a determination that the error policy profile specifies operating the memory modules in a reliability mode if licensed, determine whether a right to use the memory modules in the reliability mode has been acquired; and
change the selected mode for operation of the memory modules, including the failing memory module, from the performance mode to the reliability mode in response to a determination that the right to use has been acquired.

8. The storage medium of claim 7, wherein the instructions to change the selected mode further comprise instructions to:
change the selected mode for operation of the memory modules, including the failing memory module, from the performance mode to the reliability mode, in response to a determination that the error policy profile specifies that the reliability mode is preauthorized for use in association with the memory modules.

9. The storage medium of claim 7, further comprising instructions to:
specify, in a configuration profile associated with the memory modules, that a spare memory module of the computing device be logically substituted for the failing memory module, in response to a determination that the error policy profile specifies that the spare memory module of the computing device is preauthorized for use in connection with the plurality of memory modules.

10. The storage medium of claim 9, further comprising instructions to:
specify in the configuration profile that the failing memory module not be utilized by the computing device in response to a determination that the error policy profile specifies deconfiguring the failing memory module.

11. The storage medium of claim 7, further comprising run time instructions to:
determine during run time whether a threshold number of memory errors have been detected for a memory device of any one of the plurality of memory modules;
in response to a determination during run time that the threshold number of memory errors have been detected for a memory device of a particular one of the memory modules, examine the error policy profile associated with the memory modules during run time;
in response to a determination that the error policy profile specifies that a spare memory module of the computing device preauthorized for use in connection with the memory modules replace a failing one of the memory modules, specify, in a configuration profile associated with the memory modules, that the spare memory module be logically substituted for the particular memory module, if the spare memory module is preauthorized for use in connection with the memory modules.

12. A method comprising:

determining that a threshold number of memory errors have been detected for one of a plurality of memory devices of a given memory module of a plurality of memory modules of a computing device;

if a performance mode is selected for operation of the memory modules, outputting a notice of a first option to replace the given memory module and a second option to acquire a right to use the memory modules in a reliability mode;

flagging the given memory module as failing in a health profile if the performance mode is selected;

after outputting the notice, determining whether the right to use has been acquired; and configuring the computing device to operate the plurality of memory modules, including the flagged memory module, in a reliability mode, in response to a determination that the right to use has been acquired.

13. The method of claim 12, wherein the determining whether the right to use has been acquired comprises:

during a boot process of the computing device, determining whether any of the memory modules has been flagged as failing; and in response to determining that one of the memory modules has been flagged as failing, determining whether an operation profile associated with the memory modules indicates that the right to use has been acquired, if the performance mode is selected.

14. The method of claim 13, wherein the determining whether the right to use has been acquired further comprises:

during the boot process, determining whether a memory test of the memory modules is due;

if the memory test is due, performing the memory test on the memory modules during the boot process; and in response to determining, based on the memory test, that one of the memory modules is failing, determining whether the operation profile indicates that the right to use has been acquired, if the performance mode is selected.

15. The method of claim 12, further comprising:

configuring the computing device to operate remaining memory modules of the plurality of memory modules in the performance mode, in response to a determination that the right to use has not been acquired, wherein the remaining memory modules comprise the plurality of memory modules excluding the flagged memory module;

performing double-chip sparing error correction in response to determining that the threshold number of memory errors have been detected, if the reliability mode is selected; and in response to determining that none of the memory modules has been flagged as failing, booting the computing device in the performance mode.

* * * * *